United States Patent
Burnett

(10) Patent No.: US 9,593,861 B1
(45) Date of Patent: Mar. 14, 2017

(54) CONTROLLING AND MONITORING INDOOR AIR QUALITY (IAQ) DEVICES

(71) Applicant: Dust Free, LP, Royce City, TX (US)

(72) Inventor: Gregg W. Burnett, Royse City, TX (US)

(73) Assignee: DUST FREE, LP, Royce City, TX (US)

( * ) Notice: Subject to any disclaimer, the term of this patent is extended or adjusted under 35 U.S.C. 154(b) by 0 days.

(21) Appl. No.: 14/180,157

(22) Filed: Feb. 13, 2014

(51) Int. Cl.
| | |
|---|---|
| B60H 1/00 | (2006.01) |
| G05D 23/00 | (2006.01) |
| C02F 1/00 | (2006.01) |
| C02F 1/32 | (2006.01) |
| G08B 21/00 | (2006.01) |
| G06F 19/00 | (2011.01) |
| F24F 11/08 | (2006.01) |

(52) U.S. Cl.
CPC .................................... F24F 11/08 (2013.01)

(58) Field of Classification Search
CPC ............. F24F 2011/0091; F24F 11/006; F24F 11/001; F24F 2011/0071; F24F 11/0015; F24F 11/0001; F24F 2011/0063
USPC ....... 236/91 C, 94; 210/746, 748.1; 340/607, 340/679; 700/108, 116
See application file for complete search history.

(56) References Cited

U.S. PATENT DOCUMENTS

| | | | | |
|---|---|---|---|---|
| 3,951,625 | A * | 4/1976 | Follette | ........................... 96/251 |
| 4,805,519 | A * | 2/1989 | Boddey | ............... F24F 11/0001 137/487.5 |
| 6,868,293 | B1 * | 3/2005 | Schurr et al. | ................... 700/22 |
| 7,600,388 | B2 * | 10/2009 | Vestal | ............................... 62/89 |
| 7,772,566 | B2 * | 8/2010 | Lee | ............................... 250/436 |
| 2005/0000365 | A1 * | 1/2005 | Nelsen et al. | .................... 96/224 |
| 2005/0097478 | A1 * | 5/2005 | Killian | ................. G06F 3/0481 715/851 |
| 2005/0188853 | A1 | 9/2005 | Scannell, Jr. | |

(Continued)

FOREIGN PATENT DOCUMENTS

| | | |
|---|---|---|
| CN | 101380482 B | 5/2012 |
| CN | 203139888 U | 8/2013 |

(Continued)

OTHER PUBLICATIONS

Use of UV Light, 2002, Triatomic.*

(Continued)

Primary Examiner — Henry Crenshaw
(74) Attorney, Agent, or Firm — Fogarty LLP

(57) ABSTRACT

Systems and methods for controlling and monitoring Indoor Air Quality (IAQ) devices are described. In some embodiments, a system may include an IAQ component configured to alter the quality of the air entering, leaving, or circulating within a building, a sensor coupled to the IAQ component, the sensor configured to determine a status of the IAQ component, and a transmitter coupled to the sensor, the transmitter configured to transmit an indication of the status to a controller. In other embodiments, a method may include receiving, at a Heating, Ventilation, and/or Air Conditioning (HVAC) thermostat, data from a sensor coupled to an IAQ component configured to alter the quality of the air entering, leaving, or circulating within a building, and determining, by the HVAC thermostat, a status of the IAQ component based upon the data.

20 Claims, 4 Drawing Sheets

(56) References Cited

U.S. PATENT DOCUMENTS

| | | | |
|---|---|---|---|
| 2006/0283965 A1* | 12/2006 | Mueller et al. | 236/51 |
| 2007/0106414 A1* | 5/2007 | Strohband | B62D 65/005 |
| | | | 700/116 |
| 2010/0044319 A1* | 2/2010 | Engel et al. | 210/746 |
| 2010/0126943 A1* | 5/2010 | Lee | 210/748.11 |
| 2011/0115664 A1* | 5/2011 | Belz et al. | 341/176 |
| 2011/0260903 A1* | 10/2011 | Wong | G08C 23/04 |
| | | | 341/176 |
| 2012/0196524 A1 | 8/2012 | Williams et al. | |
| 2012/0253523 A1 | 10/2012 | Harrod et al. | |
| 2012/0304866 A1 | 12/2012 | Barrett | |
| 2012/0319851 A1* | 12/2012 | Hoglund et al. | 340/607 |
| 2013/0134781 A1 | 5/2013 | Kang et al. | |
| 2013/0226352 A1 | 8/2013 | Dean-Hendricks et al. | |

FOREIGN PATENT DOCUMENTS

| | | |
|---|---|---|
| JP | 2012107849 A | 6/2012 |
| KR | 1020100082616 A | 7/2010 |
| KR | 1020130019155 A | 2/2013 |

OTHER PUBLICATIONS

Smart Contractor Products, "Smart HVAC Products," Retrieved from http://www.smarthvacproducts.com/product/air-filter-monitor on Feb. 14, 2014, (2 pages).

* cited by examiner

CONTROLLING AND MONITORING INDOOR AIR QUALITY (IAQ) DEVICES

TECHNICAL FIELD

Embodiments disclosed herein are directed, in general, to indoor air quality devices and, more specifically, to systems and methods for controlling and monitoring Indoor Air Quality (IAQ) devices.

BACKGROUND

Heating, ventilation, and/or air conditioning (HVAC) systems are often used to control the ambient temperature within buildings, houses, or other structures. Modern HVAC systems include a controller or thermostat configured to control one or more components of the HVAC system. For example, a typical thermostat may be used to turn on a fan, set the indoor temperature, or to schedule the system's usage over the course of a day, week, or month. Furthermore, some HVAC systems may also include one or more Indoor Air Quality (IAQ) devices that are useful for regulating the indoor air quality within the building.

The inventor hereof has recognized, however, that a conventional HVAC controller is not configured to monitor or control IAQ devices. For example, there is currently no way in which a user can determine the status of a media air filter or ultraviolet light source within an IAQ device in an automated or remote fashion.

SUMMARY

Embodiments disclosed herein are directed to systems and methods for controlling and monitoring Indoor Air Quality (IAQ) devices. In an illustrative, non-limiting embodiment, a system may include an IAQ component configured to alter the quality of the air entering, leaving, or circulating within a building, a sensor coupled to the IAQ component, the sensor configured to determine a status of the IAQ component, and a transmitter coupled to the sensor, the transmitter configured to transmit an indication of the status to a controller.

In some implementations, the IAQ component may include a media air filter and the sensor may include a temperature sensor coupled to the media air filter. In other implementations, the IAQ component may include an ultraviolet (UV) light source and the sensor includes a voltage or current detector coupled to a ballast configured to power the UV light source. In yet other implementations, the IAQ component may include a humidifier, a dehumidifier, or an electronic air cleaner.

The status may include at least one of: whether the IAQ component is present, whether the IAQ component is functioning properly, or an expected remaining lifespan of the IAQ component. The transmitter may include a wireless transmitter configured to implement a WiFi (IEEE 802.11), BLUETOOTH, ZIGBEE, ECOBEE, RED LINK, or WEAVE protocol. In some cases, the controller may include a Heating, Ventilation, and/or Air Conditioning (HVAC) thermostat. Additionally or alternatively, the controller may include a network router or modem.

In yet another illustrative, non-limiting embodiment, a computer system may include a processor and a memory coupled to the processor, the memory having program instructions stored thereon that, upon execution by the processor, cause the system to receive an indication of a status of an IAQ component, the IAQ component configured to configured to alter the quality of the air entering, leaving, or circulating within a building, wherein the status is determined by a sensor coupled to the IAQ component and transmitted to the system, at least in part, via a wireless transmitter. The computer system may be further configured to display the indication to a user.

For example, the computer system may include a mobile device, tablet, laptop, or personal computer. The IAQ component may include a media air filter and the sensor may include a temperature sensor coupled to the media air filter. The status may include an indication of a level of airflow obstruction of the media air filter, the level of airflow obstruction determined based upon a temperature captured by the temperature sensor. The IAQ component may include an ultraviolet (UV) light source and the sensor include may a voltage or current detector coupled to a ballast configured to power the UV light source. Also, the status may include an indication of an expected remaining lifespan of the UV light source, the expected remaining lifespan of the UV light source determined based upon a voltage or current determined by the voltage or current detector.

In yet another illustrative, non-limiting embodiment, a method may include receiving, at an HVAC thermostat, data from a sensor coupled to an IAQ component configured to alter the quality of the air entering, leaving, or circulating within a building, and determining, by the HVAC thermostat, a status of the IAQ component based upon the data.

In some cases, the IAQ component may include a media air filter, the data may include temperature, and the status may include a level of airflow of the media air filter. In other cases, the IAQ component may include an UV light source, the data may include a voltage or current, and the status may include an expected remaining lifespan of the UV light source. The method may further include transmitting, by the HVAC thermostat, an indication of the status to a computer system.

In still another illustrative, non-limiting embodiment, a system may include one or more sensors configured to monitor a replaceable component in an IAQ device and to report a status of the replaceable component using a wireless communication protocol. For example, the one or more sensors may include at least one of a: temperature sensor, a pressure sensor, an airflow sensor, a noise or sound sensor, a humidity sensor, an electromagnetic radiation sensor, a bioaresosol sensor, or a Volatile Organic Compounds (VOC) sensor. The replaceable component may include a media air filter or an UV light source. Further, the wireless communication protocol may include a WiFi, BLUETOOTH, ZIGBEE, ECOBEE, RED LINK, or WEAVE protocol.

In various embodiments, one or more of the techniques described herein may be performed using one or more thermostats, HVAC controllers, computer systems, mobile devices, tablets, etc. In other various embodiments, a tangible computer-readable storage medium may have program instructions stored thereon that, upon execution by one or more of the aforementioned systems, cause the system(s) to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Figure 1:
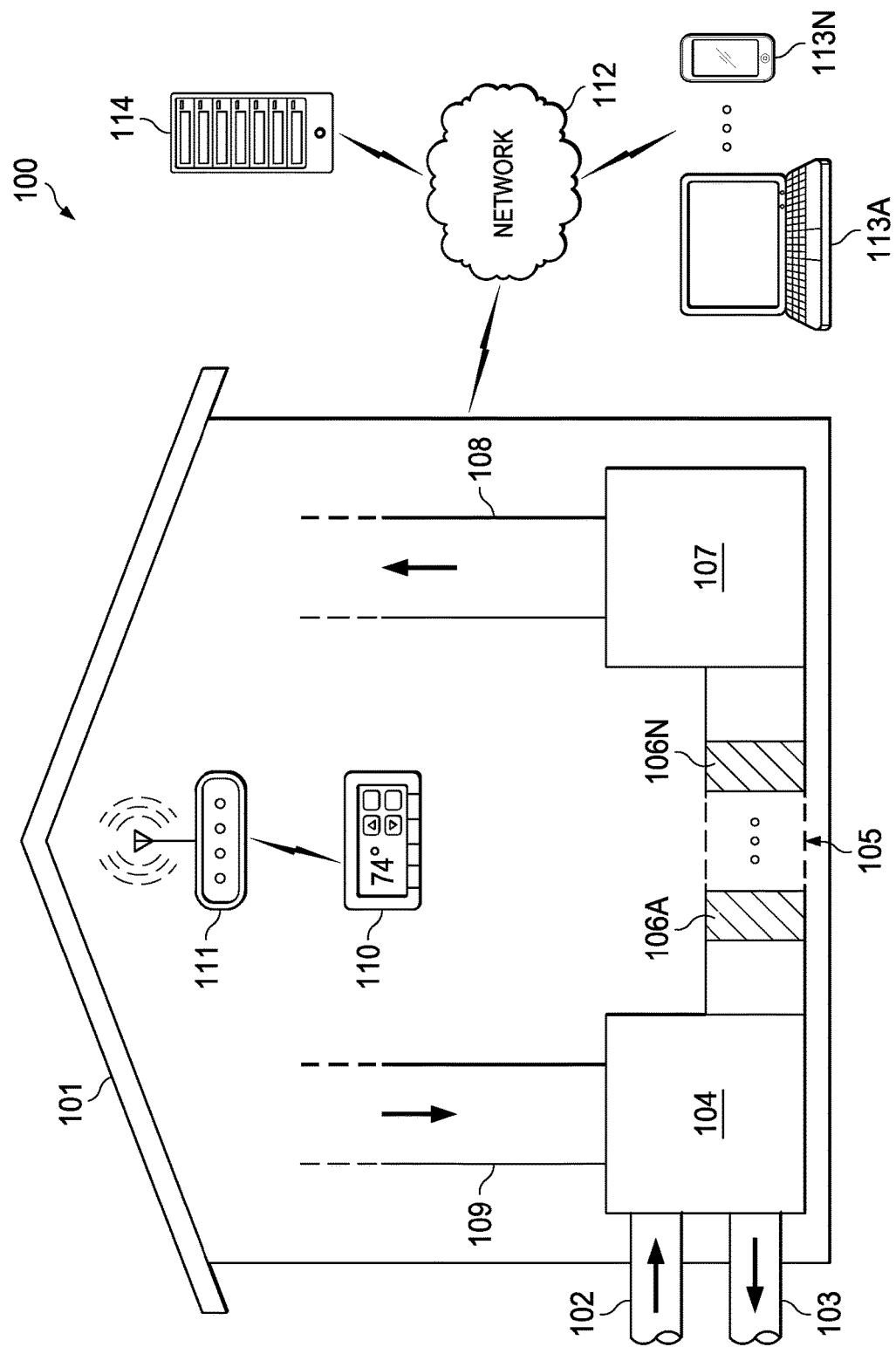

Having thus described the invention in general terms, reference will now be made to the accompanying drawings, which are not necessarily drawn to scale, and wherein:

FIG. 1 is a diagram of an environment where systems and methods for controlling and monitoring Indoor Air Quality (IAQ) devices may be used according to some embodiments.

Figure 2:
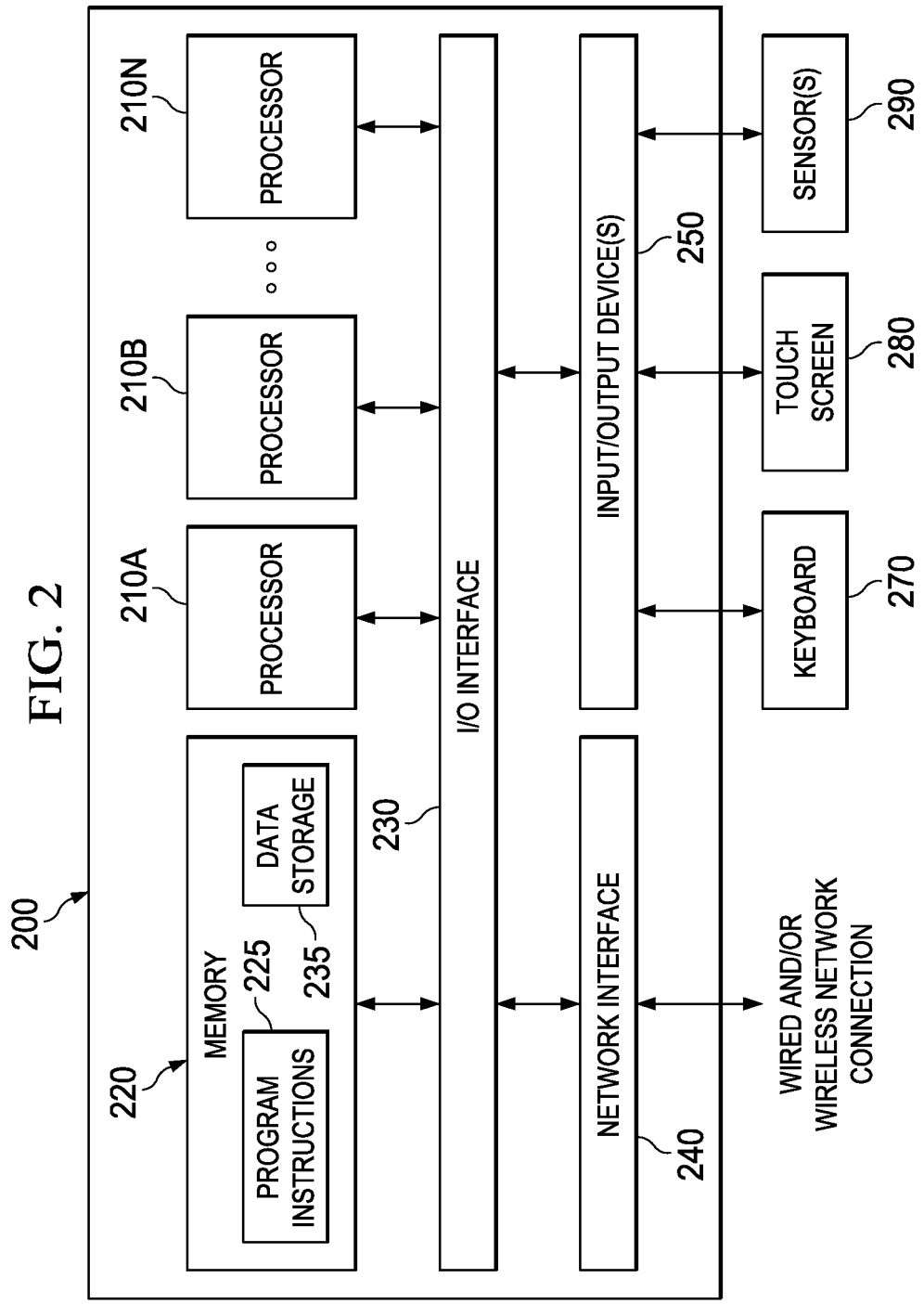

FIG. 2 is a block diagram of a computer system adapted for use with systems and methods for controlling and monitoring IAQ devices according to some embodiment.

Figure 3:
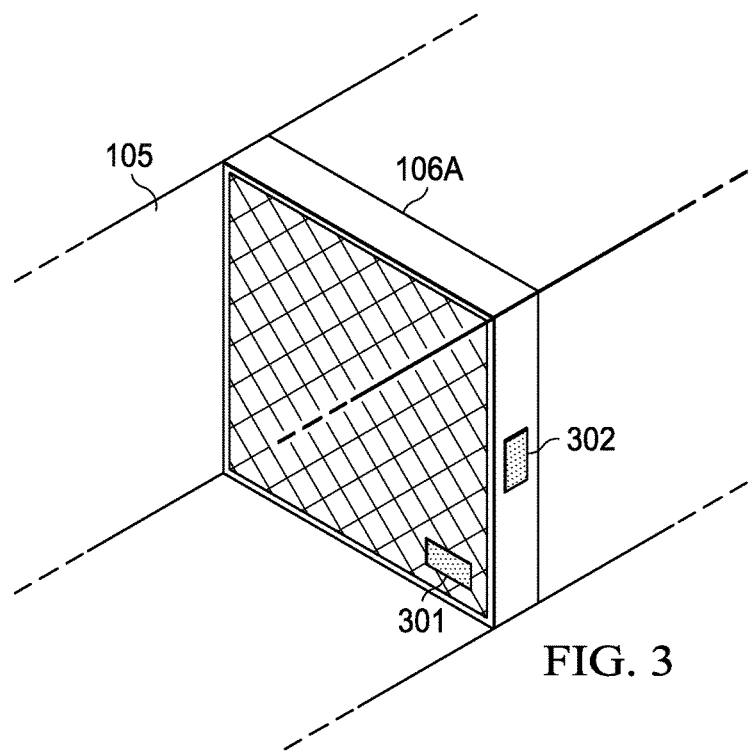

FIG. 3 is a diagram of a media air filter monitoring system according to some embodiments.

Figure 4:
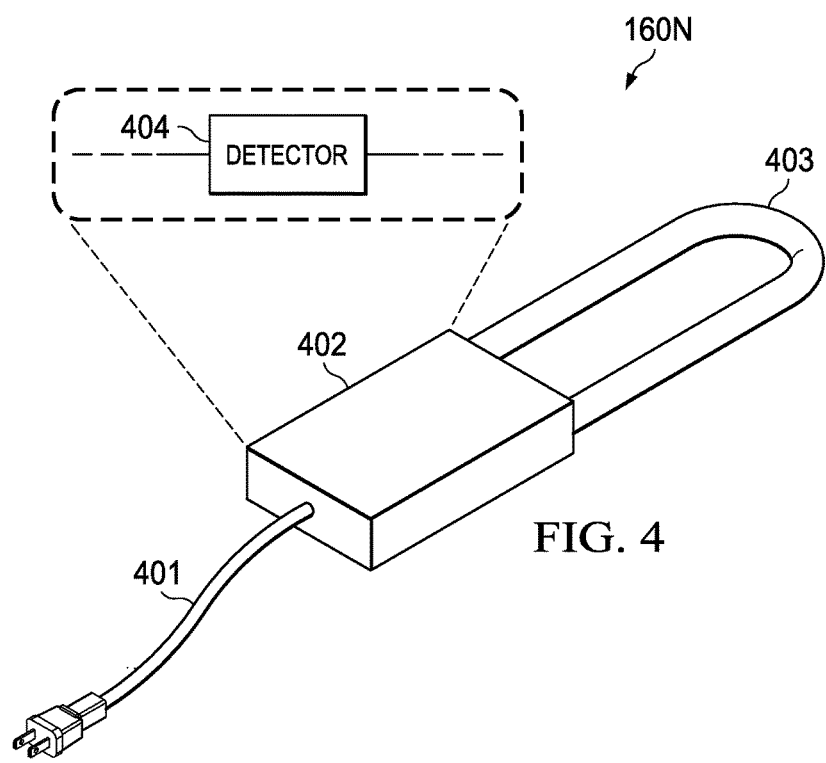

FIG. 4 is a diagram of an ultraviolet (UV) light source according to some embodiments.

Figure 5:
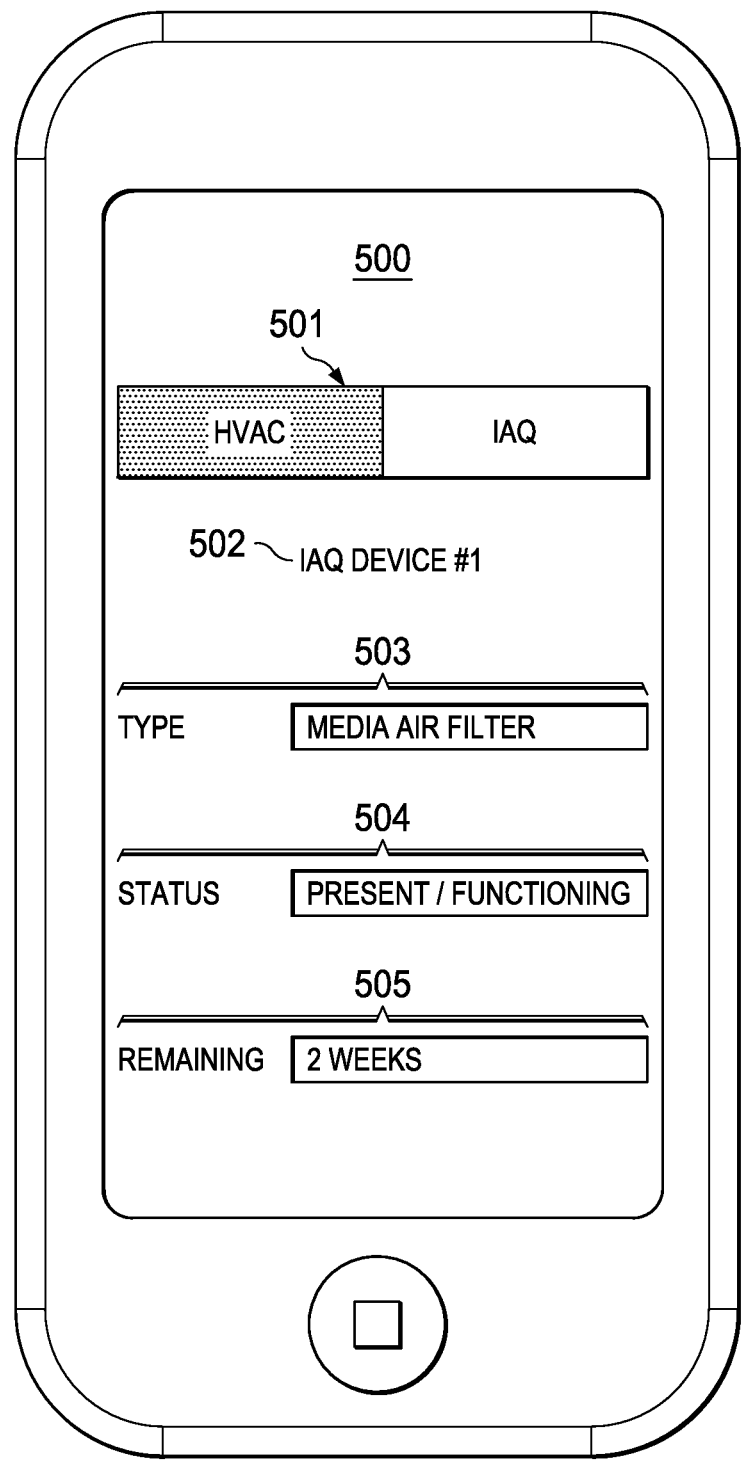

FIG. 5 is a screenshot of a Graphical User Interface (GUI) according to some embodiments.

DETAILED DESCRIPTION

Embodiments disclosed herein relate to systems and methods for controlling and monitoring Indoor Air Quality (IAQ) devices. Examples of IAQ devices include, but are not limited to, humidifiers, dehumidifiers, media air cleaners or filters, electronic air cleaners, air ionizers, ultraviolet (UV) air treatment devices or coils, bypass HEPA air filters, energy recovery ventilators (ERV), heat recovery ventilators (HRV), electronically enhanced air filters, photo catalytic air purifiers, forced air zoning devices, etc. Accordingly, the term "IAQ device," as used herein, is intended to distinguish the aforementioned types of devices from conventional Heating, Ventilation, and Air Conditioning (HVAC) devices, such as compressors, fans, heaters, coolers, etc.

FIG. 1 is a diagram of environment 100 where systems and methods for controlling and monitoring IAQ devices or components may be used. In some embodiments, a building, house, or other structure 101 may include a Heating, Ventilation, and Air Conditioning (HVAC) system. Although FIG. 1 shows a conventional forced air type HVAC system, it should be noted that other types of HVAC systems may include, for example, boiler systems, radiant heating systems, electric heating systems, cooling systems, heat pump systems, and/or any other suitable type of HVAC system. Moreover, in some implementations, one or more IAQ devices or components may be used as standalone devices that are used outside of the context of, or used independently from, an HVAC system.

The HVAC system of FIG. 1 includes HVAC component 107, a system of ductwork and air vents including supply air duct 108 and return air duct 109, and HVAC controller or thermostat 110. HVAC component 107 may include, for instance, a furnace, a heat pump, an electric heat pump, a geothermal heat pump, an electric heating unit, an air conditioning unit, a ventilation unit, etc.

In various implementations HVAC controller or thermostat 110 may be configured to control air temperature within building or structure 101 by activating and deactivating HVAC component 107 in a controlled manner. HVAC controller or thermostat 110 may be configured to control the HVAC component 107 via wired or wireless communications. HVAC controller or thermostat 110 may communicate with HVAC component 107 following a wireless protocol such as cellular communication, ZIGBEE, BLUETOOTH, WiFi, ECOBEE, RED LINK, WEAVE or any other suitable wireless protocol. For example, thermostat 110 may be an ecobee Smart Thermostat® or a Nest Learning Thermostat™, or thermostat 110 may be part of a RedLINK™ Comfort System from Honeywell International, Inc.

In some cases, the HVAC controller or thermostat 110 may be a wall mountable thermostat or the like. Such a thermostat may include or have access to a temperature sensor configured to sense an ambient temperature at or near the thermostat. In some instances, HVAC controller or thermostat 110 may be a zone controller, or may include multiple zone controllers each monitoring and/or controlling the comfort level within a particular zone in the building or other structure.

HVAC component 107 may provide heated and/or cooled air via ductwork 108 throughout building 101. In operation, HVAC controller or thermostat 110 provides a signal to HVAC component 107 to supply heated or cooled air to one or more rooms and/or zones within the building 110 via supply air ducts 108. A blower or fan (not shown) may force heated air through supply air duct 108 by a blower or fan. In this example, air from each zone may be returned to the HVAC component 107 via return air ducts 109.

In some cases, ventilation unit 104 may draw outside air into the building via outside air intake 102 and at the same time expel inside air via inside air outlet 103. As such, ventilation unit 104 may include additional fans and/or blowers to facilitate the exchange of stale air from within building 101 with fresh air supplied from the outside. Ventilation unit 104 may include its own ventilation controller (not shown) that may receive ventilation commands from, for example, HVAC controller or thermostat 110 and, in response, may activate and/or deactivate the various components within ventilation unit 104 to implement those commands.

In some cases, ventilation unit 104 may be controlled according to a predetermined schedule or predetermined set point stored in HVAC controller or thermostat 110. As such, HVAC controller 110 may be configured to allow a user to select certain time periods in which ventilation unit 104 will operate or not operate and/or its speed.

In addition to providing basic airflow and air temperature controls for conventional elements 102-105 and 107-109, the HVAC system may also include any number of Indoor Air Quality (IAQ) devices or components 106A-N capable of improving and/or altering the quality of the air circulating within structure 101. In some cases, one or more of IAQ devices 106A-N may be coupled to the HVAC system via ductwork 105. In other cases, one or more of IAQ devices 106A-N may be integrated into or otherwise coupled to other HVAC components such as components 104 or 107, or may be standalone devices.

In various implementations, each of IAQ devices 106A-N may have one or more sensors configured to detect the device's presence, status, operational conditions, or any other information related to that device such as, for example, the status of components (e.g., performance components) that require maintenance or replacement. To detect the foregoing, these sensors may be equipped to measure any number of parameters over time including, but not limited to, temperature, pressure, airflow, noise, sounds (audible and/or inaudible), voltage, current, resistance, capacitance, humidity, electromagnetic radiation (visible and/or invisible), bioaresosols, Volatile Organic Compounds (VOCs), other airborne components, and the like. These parameters may provide a direct indication of the status of an IAQ device (e.g., the current drawn by a photo catalytic device, or the light generated by an ultraviolet (UV) light source). Alternatively, the parameters may provide an indirect indication from which the status of the IAQ device may be inferred (e.g., changes in airflow or VOCs downstream of an air filter). The values of these parameters can then be used to determine if the IAQ device is operating and/or requires maintenance or replacement.

These sensors on IAQ devices 106A-N may be operably coupled to HVAC controller or thermostat 110 via a wireless link. For example, the sensors may have a transceiver and/or antenna that provides communication via publicly available (e.g., WiFi) or proprietary wireless protocol. In other embodiments, other active or passive communication technologies, such as Radio Frequency ID (RFID), may be used. As such, each of IAQ devices 106A-N may be detectable by HVAC controller or thermostat 110, and other information about IAQ devices 106A-N previously unknown to a user (absent manual and/or visual inspection) may be made available through HVAC controller or thermostat 110.

In one embodiment, a user may manually identify the IAQ devices 106A-N to router, modem, or gateway 111 and/or to HVAC controller or thermostat 110, such as by "pairing" of wireless devices. Such manual pairing would allow the user to selectively determine which IAQ devices 106A-N are connected, monitored, and/or controlled and may increase system security through the use of optional passwords, passcodes, etc. to complete the pairing. In other embodiments, router, modem, or gateway 111 and/or to HVAC controller or thermostat 110 may automatically detect the wireless sensors on IAQ devices 106A-N. For example, the wireless sensors may broadcast identification and status information that allows the router, modem, or gateway 111 and/or to HVAC controller or thermostat 110 to detect the IAQ devices with or without wireless pairing. The wireless sensors on the IAQ devices may broadcast or transmit information such as the manufacturer, make, model, serial number, version, status, etc. Upon detection of this information, the IAQ device may be paired to and/or monitored by router, modem, or gateway 111 and/or to HVAC controller or thermostat 110. Optionally, the user may confirm such automatic detection to ensure that the detected IAQ device is part of the user's system and not in a neighboring building or system.

Router, modem, or gateway 111 may be in communication with HVAC controller or thermostat 110 and it may allow HVAC controller or thermostat 110 to access network 112. For example, network 112 may include any suitable computer network including, but not limited to, the Internet. As such, user devices 113A-N (e.g., desktops, laptops, tablets, mobile phones, smartphones, smart watches, smart glasses, etc.) may be able to access HVAC controller or thermostat 110 remotely to retrieve information about IAQ devices 106A-N and/or to control aspects of their operation. Moreover, server 114 may be accessible to HVAC controller or thermostat 110 to provide information related to IAQ devices 106A-N, such as discovery information or the like. These, and other features, are discussed in more detail below.

In other embodiments, HVAC controller or thermostat 110 and router, modem, or gateway 111 may be part of a single device FIG. 2 is a block diagram of a computer system adapted for use with systems and methods for controlling and monitoring IAQ devices according to some embodiments. In various embodiments, system 200 may be a server, a workstation, a desktop computer, a laptop, a tablet computer, a mobile device, a smart phone, or the like. In some cases, system 200 may be adapted to implement HVAC controller or thermostat 110, router 111, user devices 113A-N, and/or server 114 shown in FIG. 1. As illustrated, computer system 200 includes one or more processor(s) 210A-N coupled to system memory 220 via input/output (I/O) interface 230. Computer system 200 further includes network interface 240 coupled to I/O interface 230, and one or more input/output devices 250, such as keyboard or input device 270, touchscreen or display 280, and/or sensor(s) 290.

In various embodiments, computer system 200 may be a single-processor system including one processor 210A or a multi-processor system including two or more processors 210A-N (e.g., two, four, eight, or another suitable number). Processor(s) 210A-N may include any processor capable of executing program instructions. For example, in various embodiments, processor(s) 210A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 210A-N may commonly, but not necessarily, implement the same ISA. Also, in some embodiments, at least one processor 210A may be a graphics processing unit (GPU) or other dedicated graphics-rendering device.

System memory 220 may be configured to store program instructions and/or data accessible by processor(s) 210A-N. In various embodiments, system memory 220 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below, may be stored within system memory 220 as program instructions 225 and data storage 235, respectively. In other embodiments, program instructions and/or data may be received, sent or stored upon different types of computer-accessible media or on similar media separate from system memory 220 or computer system 200. Generally speaking, a computer-accessible medium may include any tangible or non-transitory storage media or memory media such as electronic, magnetic, or optical media—e.g., disk or CD/DVD-ROM coupled to computer system 200 via I/O interface 230. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 230 may be configured to coordinate I/O traffic between processor(s) 210A-N, system memory 220, and any peripheral devices in the device, including network interface 240 or other peripheral interfaces, such as input/output devices 250. In some embodiments, I/O interface 230 may perform any necessary protocol, timing or other data transformations to convert data signals from one component (e.g., system memory 220) into a format suitable for use by another component (e.g., processor(s) 210A-N). In some embodiments, I/O interface 230 may include support for devices attached through various types of peripheral buses, such as a variant of the Peripheral Component Interconnect (PCI) bus standard or the Universal Serial Bus (USB) standard, for example. In some embodiments, the function of I/O interface 230 may be split into two or more separate components, such as a north bridge and a south bridge, for example. In addition, in some embodiments some or all of the functionality of I/O interface 230, such as an interface to system memory 220, may be incorporated directly into processor(s) 210A-N.

Network interface 240 may be configured to allow data to be exchanged between computer system 200 and other devices attached to a network (e.g., telecommunications network 104 of FIG. 1), such as other computer systems, or between nodes of computer system 200. In various embodiments, network interface 240 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol.

Input/output devices 250 may, in some embodiments, include one or more display terminals, keyboards, keypads, touchpads, scanning devices, RFID readers, NFC readers, voice or optical recognition devices, or any other devices suitable for entering or retrieving data by one or more computer system 200. Multiple input/output devices 250 may be present in computer system 200 or may be distributed on various nodes of computer system 200. In some embodiments, similar input/output devices may be separate from computer system 200 and may interact with one or more nodes of computer system 200 through a wired or wireless connection, such as over network interface 240.

As shown in FIG. 2, memory 220 may include program instructions 225, configured to implement certain embodiments described herein, and data storage 235, comprising various data may be accessible by program instructions 225. In an embodiment, program instructions 225 may include software elements of embodiments illustrated in the above figures. For example, program instructions 225 may be implemented in various embodiments using any desired programming language, scripting language, or combination of programming languages and/or scripting languages (e.g., C, C++, C#, Java™, JavaScript™, Perl, etc.). Data storage 235 may include data that may be used in these embodiments (e.g., recorded communications, profiles for different modes of operations, etc.). In other embodiments, other or different software elements and data may be included.

A person of ordinary skill in the art will appreciate that computer system 200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

FIG. 3 is a diagram of a media air filter monitoring system according to some embodiments. In many instances, one or more air filters 106A are examples of IAQ devices that may be used to remove dust and other pollutants from the air inside building 101. Particularly, media air filter 106A may be inserted into a slot, trap, or door of air duct 105, and may filter the air prior to it reaching HVAC component 107 and being distributed within building 101. In other embodiments, however, media air filter 106A may be introduced elsewhere within the HVAC system. Generally speaking, air filter 106A may be designed to improve the indoor air quality within building 101.

In some embodiments media air filter 106A may include an electronic chip or tag 301 (e.g., a Radio Frequency Identification (RFID) tag, a Near Field Communications (NFC) tag, or the like). Electronic chip or tag 301 may include a product number, serial number, or any other suitable identification information that supports automatic discovery by HVAC controller or thermostat 110. Additionally or alternatively, electronic chip or tag 301 may also include a temperature and/or pressure sensing device, such as a thermocouple or thermistor, configured to determine the temperature and/or pressure in the vicinity of air media filter 106A and its variations over time.

Duct 105 may include module 302 configured to communicate with HVAC controller or thermostat 110 via a wired or wireless communication link. In other cases, module 302 may be incorporated or combined with the HVAC controller or thermostat 110. Moreover, module 302 may be configured to detect or communicate with electronic chip or tag 301 of media air filter 106A, to collect information from electronic chip or tag 301, and to provide that information to HVAC controller or thermostat 110.

In some embodiments, HVAC controller or thermostat 110 may use the data from the module 302 to identify the presence and/or type of media air filter 106A, and evaluate the IAQ device's operation and/or performance. For example, HVAC controller or thermostat 110 may receive identification information stored in electronic chip or tag 301 and may determine that a filter is actually installed in the HVAC system. Additionally or alternatively, HVAC controller or thermostat 110 may receive the identification information, may access server 114 to match the identification information to a particular air filter model, and may adjust one or more parameters related to the operation of HVAC component 107 or ventilator 104. For example, when HVAC controller or thermostat 110 determines that media air filter is a more airflow restrictive model, it may increase the fan speed, increase the duration that the fan is turned on, or open additional vents in duct 108 in order to compensate for the decreased airflow. Conversely, when media air filter is less restrictive, HVAC controller or thermostat 110 may decrease the fan speed, decrease the duration that the fan is turned on, or close additional vents. In various embodiments, HVAC controller or thermostat 110 may be configured to make these changes in a manner that is automatic and invisible to the end user.

Additionally or alternatively, HVAC controller or thermostat 110 may compare temperature data collected by electronic chip or tag 301 to determine a current operating performance of media air filter 106A, for example, by measuring a change in a parameter related to the amount of airflow through media air filter 106A to determine an expected remaining lifespan of media air filter 106A (e.g., replacement is expected to be needed in a given number of days, weeks, or months). This information may then be provided to the end user via an interface of the HVAC controller or thermostat 110 and/or via user devices 113A-N.

Additionally or alternatively, electronic chip or tag 301 may include a pressure sensor, and airflow and/or airflow restriction sensor (e.g., a mass airflow sensor such as a vane meter or the like), a humidity sensor (e.g., a capacitive-type humidity sensor), a noise or sound sensor (e.g., a microphone, piezoelectric transducer, etc.), a photo/image/visual sensor (e.g., a photodiode, a CCD or CMOS sensor, etc.), an oxygen sensor (e.g., a lambda sensor), etc. Each such sensor may be configured to determine: (i) how clogged media air filter 106A is, and/or (ii) how clean the air is upstream and/or downstream from filter 106A. Again, a change over time in any of these parameters, or any suitable combination of parameters, may be used to determine an expected remaining lifespan of media air filter 106A, which may in turn be provided to the end user via an interface of the HVAC controller or thermostat 110 and/or via user devices 113A-N.

FIG. 4 is a diagram of UV light source 106N according to some embodiments. In some implementations, UV source 106N may be part of a photocatalytic IAQ device and it may be configured to generate UV light that illuminates one or more photocatalytic structures, which in turn may be, for example, a hydrated catalytic matrix, such as a hydrated quad-metallic catalyst. When the ultraviolet light impacts the photocatalytic structures, ozone is produced in the catalytic matrix. The catalyst supports a hydroxyl radical reaction with water vapor that results in hydro peroxides, hydroxyl ions, super oxide ions, passive negative ions hydroxides, and ozonide ions. These are highly reactive chemical species. The hydroxyl radicals are very strong oxidizers and will attack organic materials. This creates oxidation that helps to reduce odors, Volatile Organic Compounds (VOCs), airborne viruses, bacteria, mold and other types of air pollution. The quad-metallic catalytic matrix may be comprised of Rhodium, Titanium, Silver and Copper for example. In other embodiments, other combinations of rare and noble metals may be used for the catalytic matrix.

Ultraviolet light source 106N may be, for example, a high-intensity, broad-spectrum ultraviolet bulb or tube. In other embodiments, the ultraviolet source may be a low-pressure fluorescent quartz bulb or a medium pressure amalgam lamp. Ultraviolet light falls in the band of light between 185 nm and 400 nm. There are three distinct bands of light within the ultraviolet spectrum: UV-A, UV-B, and UV-C. Longwave UV light (315 nm to 400 nm), or UV-A, refers to what is commonly called "black light." Midrange UV (280 nm to 315 nm), or UV-B, causes sunburn. Germicidal UV light (185 nm to 280 nm), or UV-C, is effective in microbial control. Research has demonstrated that the most efficient frequency for microbial destruction is between 254 nm and 265 nm within the UV-C band. Germicidal lamps that produce the majority of their output in this range will be the most effective in microbial control/destruction.

As illustrated in FIG. 4, UV light source 106N includes power cord 401, ballast or power source 402, and bulb 403. In some cases, ballast 402 may include a voltage or current detector 404 configured to monitor the voltage and/or current consumption of UV light source 106N over time. Ballast 402 may also include an electronic chip or tag similar to chip or tag 301 in FIG. 3. Depending upon where UV light source 106N is installed, another module similar to module 302 may be deployed to identify the presence and/or specific model of the IAQ device using UV light source 106N.

In some embodiments, HVAC controller or thermostat 110 may receive data provided by module 302 and it may identify the presence of UV light source 106N. Additionally or alternatively, HVAC controller or thermostat 110 may receive data captured by detector 404 and it may determine an expected remaining life of UV light source 106N. Depending upon the expected remaining life of the IAQ device, HVAC controller or thermostat 110 may increase or decrease the fan speed, increase or decrease the duration that the fan is turned on, or open/close additional vents in duct 108 in order to compensate for the decreased radiation emitted by UV lamp 403. Again, in various embodiments, HVAC controller or thermostat 110 may be configured to make these changes in a manner that is automatic and invisible to the end user.

It should be noted that other types of IAQ devices may be used, and therefore different types of sensor may be deployed. For instance, in some cases, an IAQ device may include an air purifier using Photo Catalytic Oxidation (PCO). Accordingly, examples of other parameters that may be measured and/or reported include, but are not limited to, the presence and/or amount of Volatile Organic Compounds (VOCs) and/or a change in electrical current within the device. Other embodiments may include IAQ devices that perform air filtration operations accompanied by measurements of particles downstream from the filtration and/or IAQ devices that include UV treatment accompanied by a measurement of bioaerosols.

FIG. 5 is a screenshot of Graphical User Interface (GUI) 500. In some embodiments, GUI 500 may be rendered under control of an application executed by one of user devices 113A-N of FIG. 1. As shown tabs 501 allow the user to select between the control and/or monitoring of conventional HVAC components (e.g., temperature, schedule, cold, hot, fan, etc.) or the control and/or monitoring of IAQ devices. In this case, the IAQ tab is selected.

Particularly, GUI 500 provides information area 502 regarding "IAQ device #1," which may be any of the aforementioned IAQ devices including those discussed in connection with FIGS. 3 and 4. Area 503 indicates the type of IAQ device being displayed, here a "media air filter." As previously noted, the type of IAQ device may be determined based upon identification information in an electronic chip or tag 301 and/or upon querying of server 114.

Area 504 indicates the status of the IAQ device such as, for example, whether the IAQ device is functioning and/or present in the HVAC system. In some cases, the status may indicate whether the device is properly installed, in need of maintenance or replacement, etc. This type of information may be obtained, for example via sensors installed in the device on near its vicinity. Meanwhile area 505 shows the estimated remaining lifetime of the device, here "2 weeks." Again, this information may be determined, at least in part, by monitoring one or more aspects of the operation of the IAQ device including, but not limited to, temperature, pressure, voltage, current, or other parameters as discussed above.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system, comprising:
   an Indoor Air Quality (IAQ) component configured to alter the quality of air entering, leaving, or circulating within a building via an HVAC (Heating, ventilation, and/or air conditioning) system, wherein the IAQ component comprises a consumable component;
   a component sensor integrated into the IAQ component, wherein the component sensor is configured to determine an installation status of the consumable component, and wherein the component sensor is further configured to determine properties of the consumable component;
   one or more airflow sensors configured to determine properties of airflow within the HVAC system;
   one or more transmitters coupled to the component sensor and the one or more airflow sensors, wherein the one or more transmitters are configured to transmit the installation status of the consumable component and the properties of the consumable component and the airflow properties to a user device; and
   an application executing on the user device, wherein the application indicates the consumable component installation status and one or more of the properties of the consumable component on a graphical user interface of the user device and wherein the application further infers lifespan information for the consumable component based on the airflow properties.

2. The system of claim 1, wherein the consumable component includes a media air filter.

3. The system of claim 2, wherein the airflow properties comprise an indication of a level of airflow respective to the media air filter.

4. The system of claim 1, wherein the consumable component includes an ultraviolet (UV) light source.

5. The system of claim 4, wherein the sensor includes a voltage or current detector coupled to a ballast configured to power the UV light source.

6. The system of claim 1, wherein the IAQ component includes a humidifier, a dehumidifier, an electronic air cleaner, a ventilation fan, or an ionizer.

7. The system of claim 1, wherein the installation status indicates that the consumable component is detected and, is functioning properly.

8. The system of claim 1, wherein the transmitter includes a wireless transmitter configured to implement a WiFi, BLUETOOTH, ZIGBEE, ECOBEE, RED LINK, or WEAVE protocol.

9. The system of claim 1, wherein the inferred lifespan information of the consumable component comprises the expected remaining life of the consumable component.

10. A wireless user device, comprising:
    a processor; and
    a memory coupled to the processor, the memory having program instructions stored thereon that, upon execution by the processor, cause the wireless user device to:
    receive an indication of an installation status of a consumable component of an Indoor Air Quality (IAQ) component, the IAQ component configured to alter the quality of air entering, leaving, or circulating within a building via an HVAC (Heating, ventilation, and/or air conditioning) system, wherein the installation status of the consumable component is determined by a component sensor coupled to the IAQ component and transmitted to the wireless user device, at least in part, via a wireless transmitter integrated in the IAQ component;
    receive an indication of a plurality properties of the consumable component of the IAQ component, wherein the properties of the consumable component are determined by the component sensor and transmitted to the wireless user device, at least in part, via the wireless transmitter of the IAQ component;
    receive an indication of one or more airflow properties within the HVAC system, wherein the airflow properties are determined by one or more airflow sensors;
    display, on the wireless user device, the installation status of the consumable component and one or more of the plurality properties of the consumable component to a user; and
    infer lifespan information of the consumable component based on the airflow properties.

11. The wireless user device of claim 10, wherein the wireless user device includes a mobile device or tablet.

12. The wireless user device of claim 10, wherein the IAQ component includes an ultraviolet (UV) light source and wherein the sensor includes a voltage or current detector coupled to a ballast configured to power the UV light source.

13. The wireless device of claim 10, wherein the consumable component includes a media air filter.

14. The wireless user device of claim 13, wherein the airflow properties include an indication of a level of airflow downstream from the media air filter.

15. The wireless user device of claim 13, wherein the installation status airflow properties include includes an indication of a level of airflow upstream from the media air filter.

16. The wireless device of claim 10, wherein the consumable component includes an ultraviolet (UV) light source.

17. The wireless device of claim 16, wherein a current draw is measured as an indication of a status of the UV light source.

18. The wireless device of claim 10, wherein the inferred lifespan information of the consumable component comprises the expected remaining life of the consumable component.

19. A system comprising:
    an Indoor Air Quality (IAQ) device configured to regulate indoor air quality provided via an HVAC (Heating, ventilation, and/or air conditioning) system, wherein the IAQ device comprises a consumable component;

a sensor attached to the IAQ device and configured to monitor an installation status of the consumable component, wherein the sensor is further configured to determine properties of the consumable component;

one or more electrical sensors configured to determine current draw properties within the HVAC system;

one or more transmitters coupled to the one or more electrical sensors, wherein the one or more transmitters are configured to transmit the installation status of the consumable component and the properties of the consumable component to a wireless user device; and an application executing on the wireless user device, the application displaying the consumable component installation status and one or more properties of the consumable component to a user via the graphical user interface of the wireless user device, wherein the application further infers lifespan information for the consumable component based on the current draw.

20. The system of claim 19, wherein the inferred lifespan information for the consumable component comprises the expected remaining life of the consumable component.

\* \* \* \* \*